United States Patent
Girodot et al.

(10) Patent No.: US 12,168,424 B2
(45) Date of Patent: Dec. 17, 2024

(54) BALL-JOINT HOUSING SUPPORT, CORRESPONDING CONNECTING ROD AND CORRESPONDING JOINING METHOD

(71) Applicant: VALEO SYSTEMES D'ESSUYAGE, La Verriere (FR)

(72) Inventors: Cyrille Girodot, La Verriere (FR); Nicolas Kuchly, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 33 days.

(21) Appl. No.: 17/801,563

(22) PCT Filed: Feb. 25, 2021

(86) PCT No.: PCT/EP2021/054728
§ 371 (c)(1),
(2) Date: Aug. 23, 2022

(87) PCT Pub. No.: WO2021/175702
PCT Pub. Date: Sep. 10, 2021

(65) Prior Publication Data
US 2023/0158999 A1    May 25, 2023

(30) Foreign Application Priority Data
Mar. 2, 2020 (FR) ..................................... 2002064

(51) Int. Cl.
*F16C 11/06* (2006.01)
*B60S 1/24* (2006.01)
*F16C 11/10* (2006.01)

(52) U.S. Cl.
CPC ............ *B60S 1/24* (2013.01); *F16C 11/0657* (2013.01); *F16C 11/0695* (2013.01);
(Continued)

(58) Field of Classification Search
CPC . F16C 11/0657; F16C 11/0695; F16C 11/106; F16C 9/045
See application file for complete search history.

(56) References Cited

U.S. PATENT DOCUMENTS 3,853,414 A * 12/1974 Hirano ................ F16C 11/0657
403/349
4,380,860 A * 4/1983 Riester ................ F16C 11/0657
384/220
(Continued)

FOREIGN PATENT DOCUMENTS

DE  102012201887 A1 * 8/2013 ................ B60S 1/24
FR  2184291 A5  12/1973
(Continued)

OTHER PUBLICATIONS

European Patent Office, International Search Report (with English translation) and Written Opinion of corresponding International Application No. PCT/EP2021/054728, dated Apr. 6, 2021.

*Primary Examiner* — Daniel D Yabut
(74) *Attorney, Agent, or Firm* — Valeo Systemes d'Essuyage

(57) ABSTRACT

The invention relates to a support of a ball-joint housing for a connecting rod of a windshield wiper actuating linkage system, the support having a ball-joint housing that extends along a longitudinal axis (B) and is configured to be received in a complementary orifice in the connecting rod. According to the invention, the support is configured to be rotationally joined to the connecting rod. The invention also relates to a connecting rod configured to be rotationally joined to such a support, and to the corresponding joining method.

10 Claims, 9 Drawing Sheets

(52) U.S. Cl.
CPC ........ *F16C 11/106* (2013.01); *F16C 2226/74* (2013.01); *F16C 2326/09* (2013.01)

(56) References Cited

U.S. PATENT DOCUMENTS

| | | | | |
|---|---|---|---|---|
| 4,552,480 | A * | 11/1985 | McIntyre | ............ F16C 11/0666 403/71 |
| 2016/0108950 | A1 | 4/2016 | Steffenfauseweh et al. | |
| 2018/0283445 | A1* | 10/2018 | Jozwiak | .................. F16C 11/06 |
| 2021/0323506 | A1* | 10/2021 | Renoux | .................. F16C 11/06 |

FOREIGN PATENT DOCUMENTS

| | | | | |
|---|---|---|---|---|
| FR | 3065763 | B1 * | 8/2019 | ................ B60S 1/24 |
| FR | 3085650 | A1 * | 3/2020 | ................ B60S 1/24 |
| GB | 2123479 | A | 2/1984 | |
| JP | S59131620 | U | 9/1984 | |
| WO | 2014198562 | A1 | 12/2014 | |
| WO | WO-2018024539 | A1 * | 2/2018 | |

\* cited by examiner

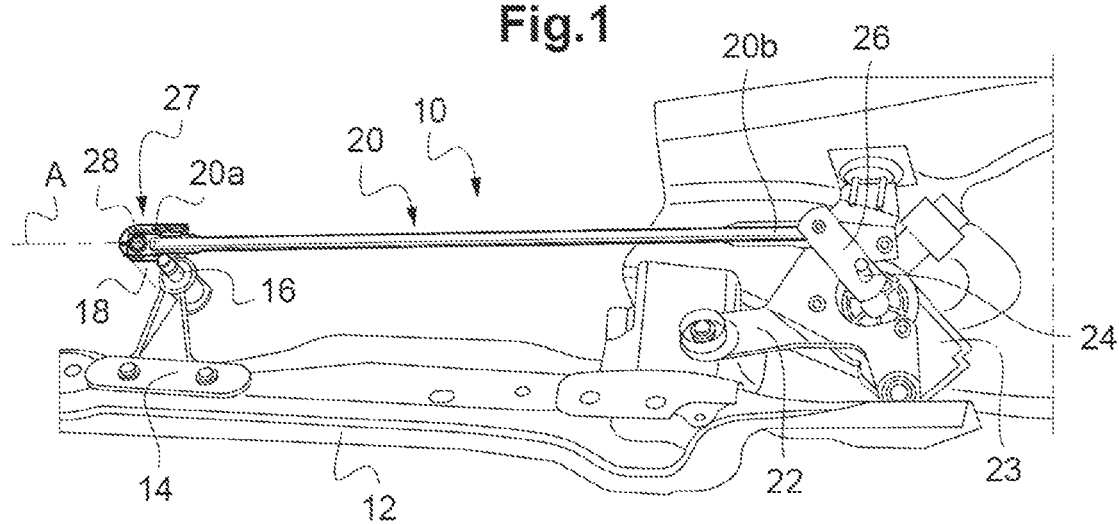
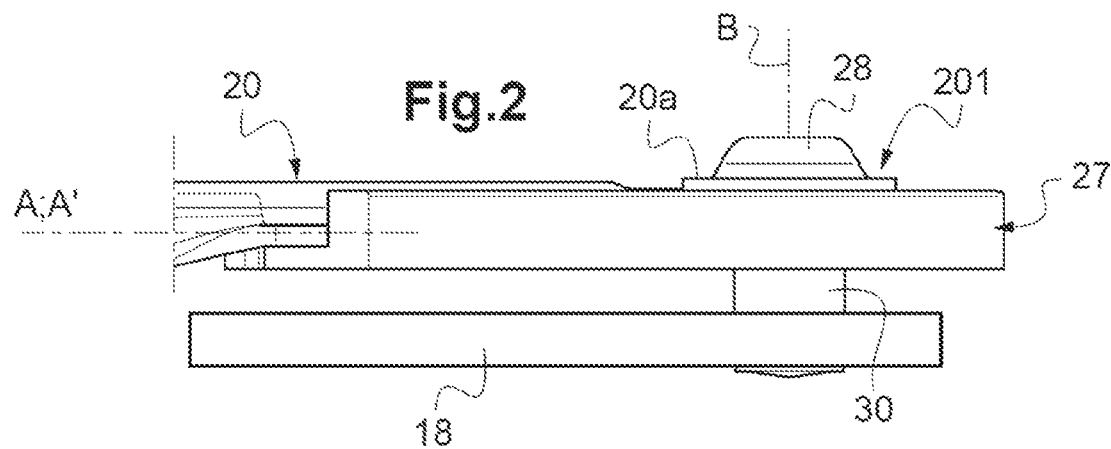

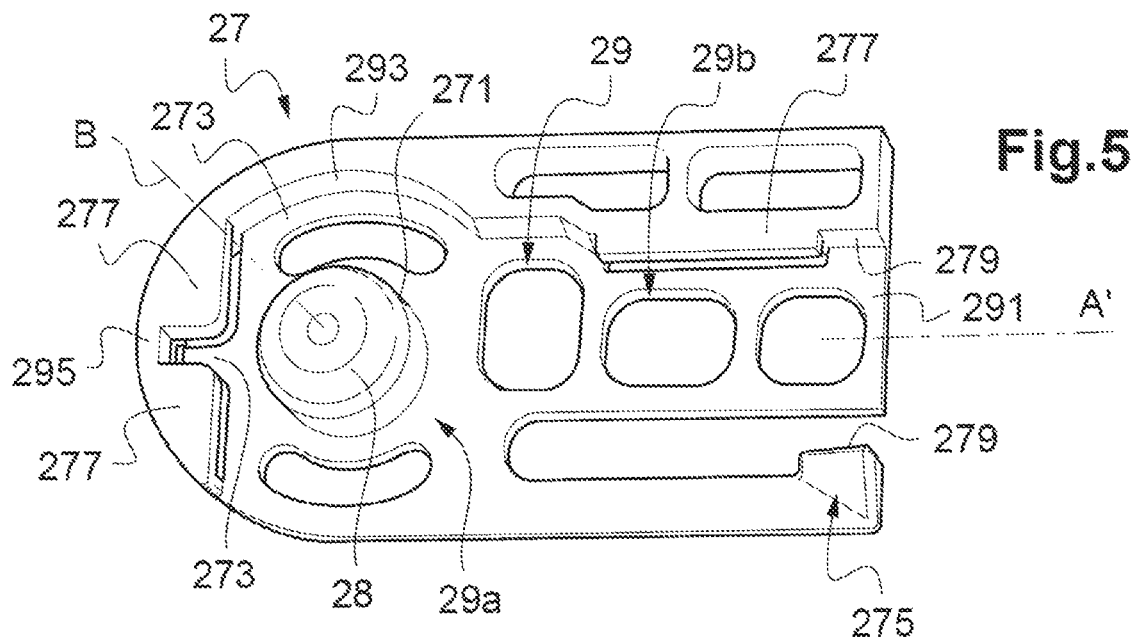
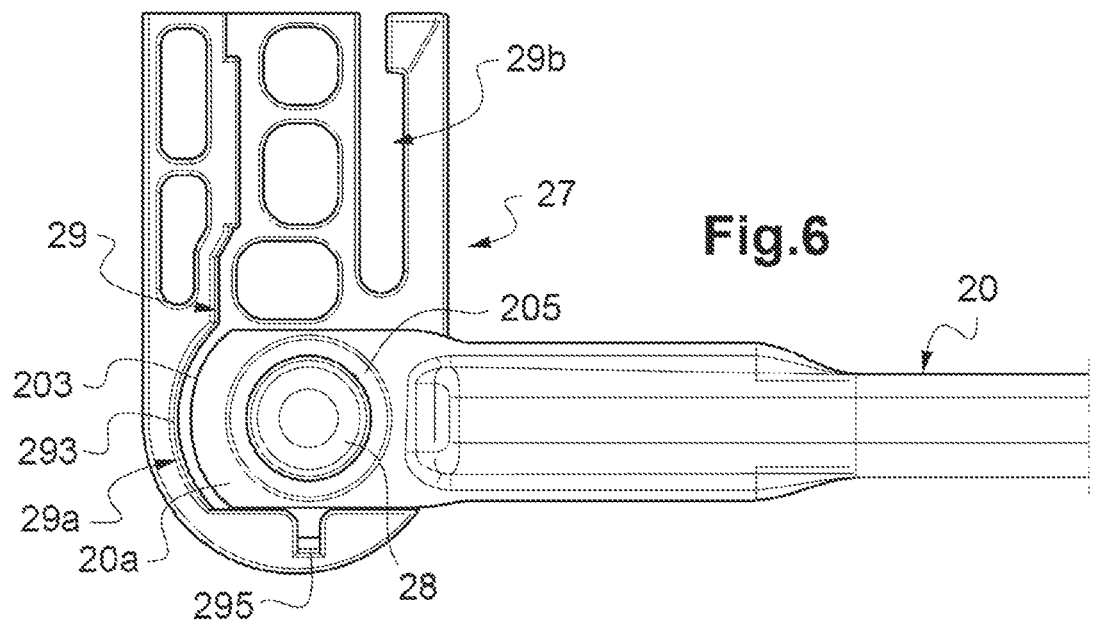

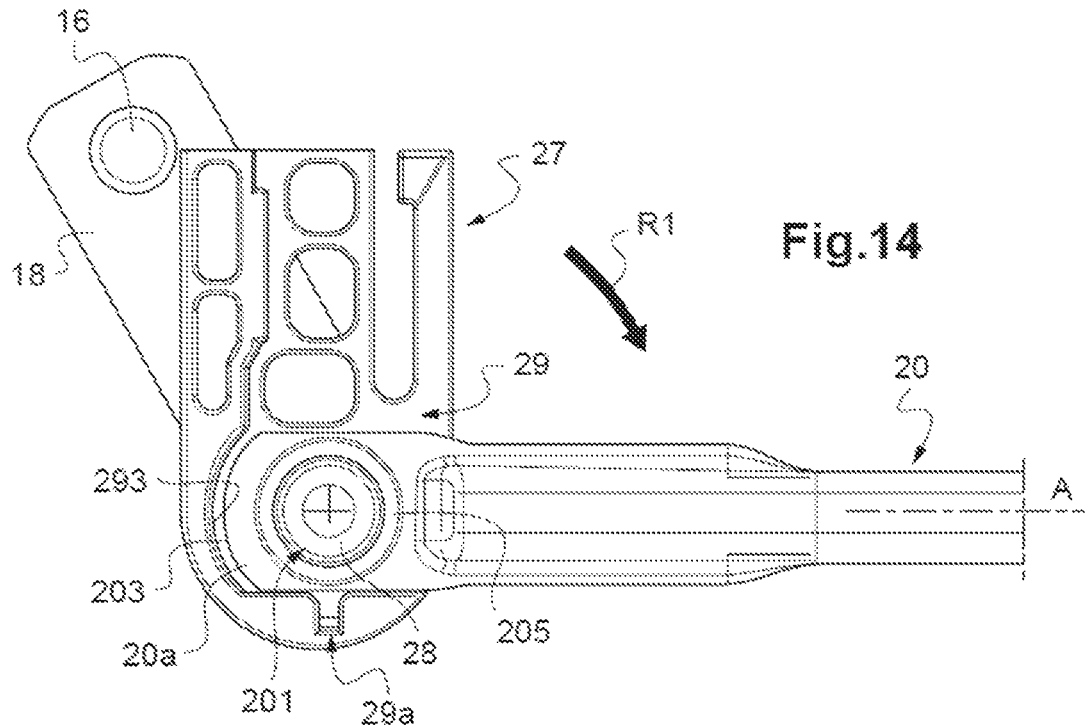
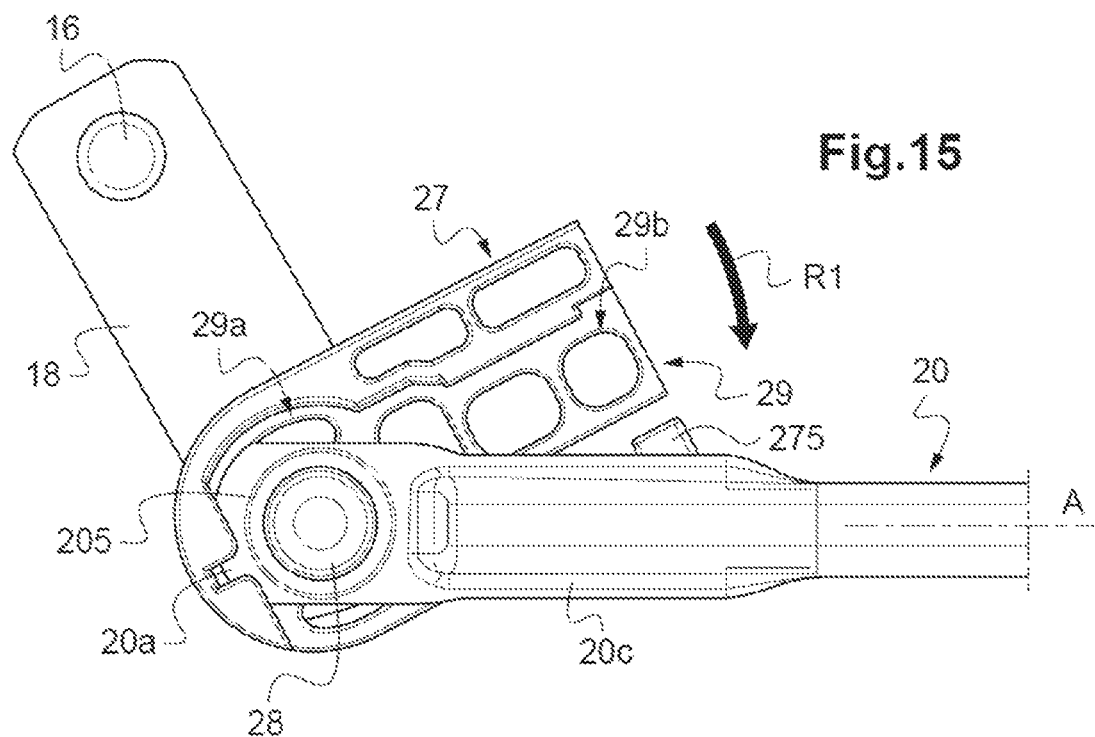

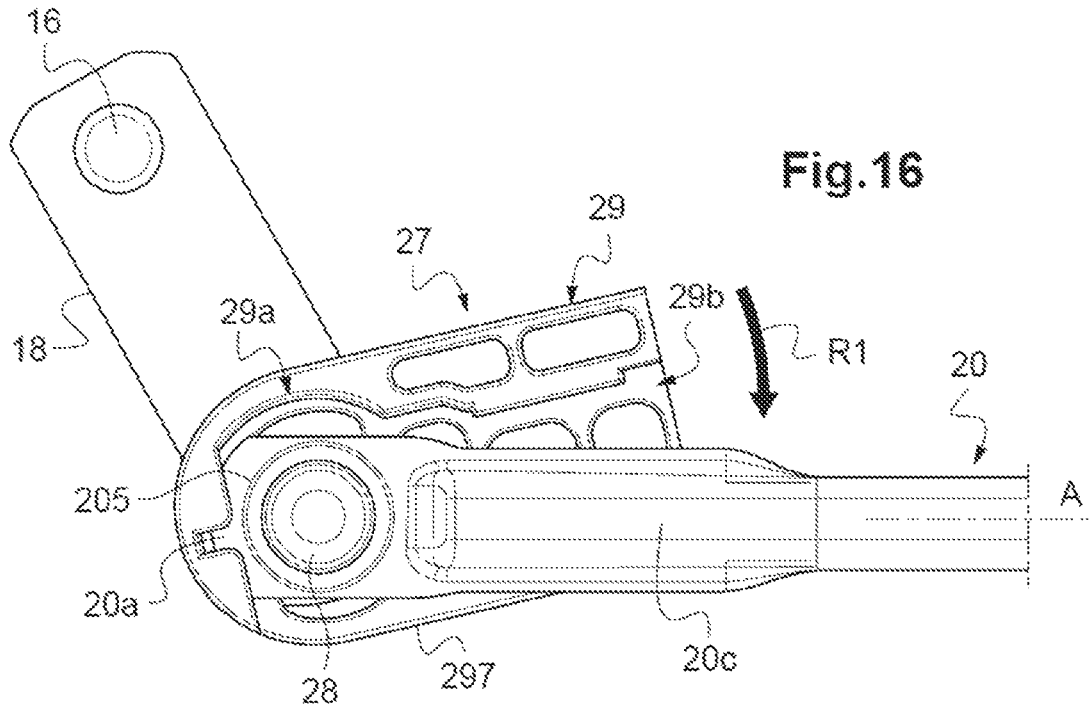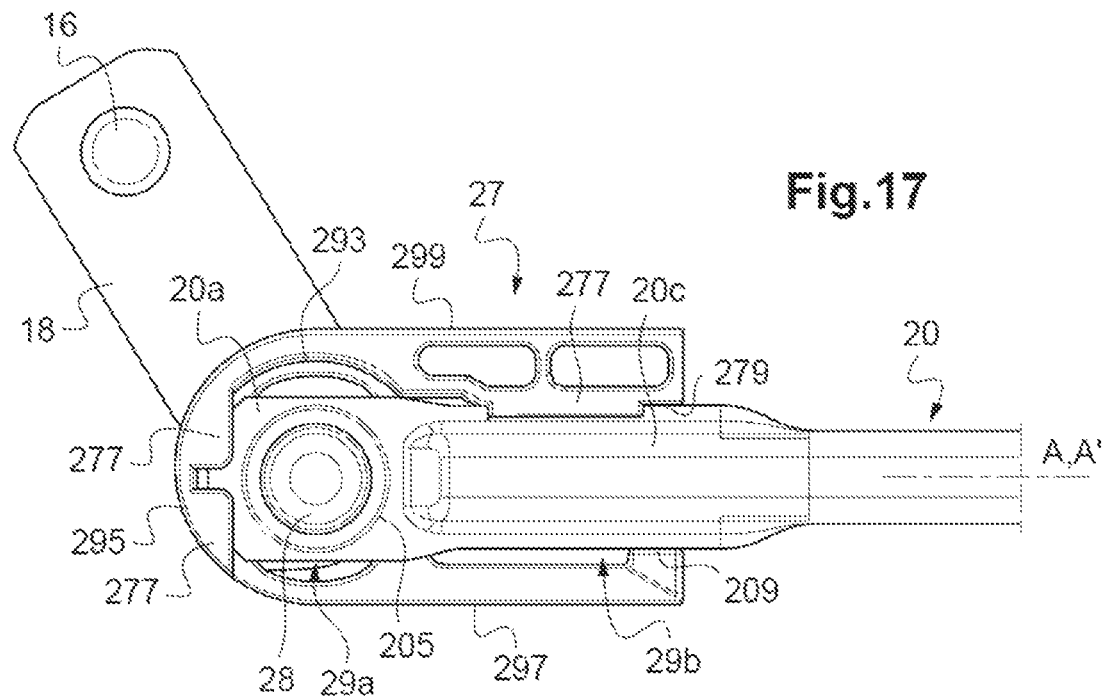

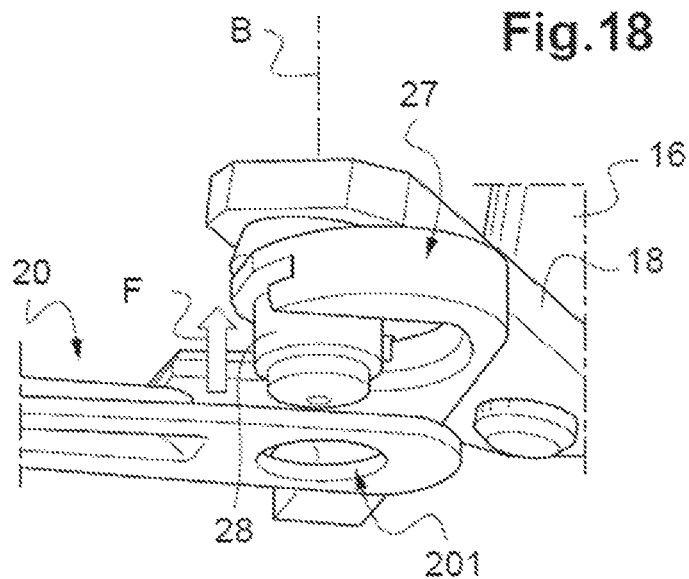
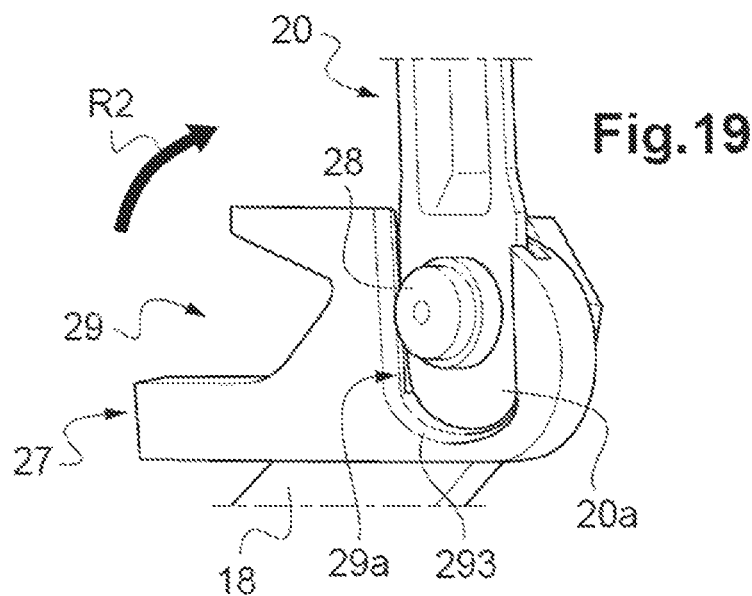

BALL-JOINT HOUSING SUPPORT, CORRESPONDING CONNECTING ROD AND CORRESPONDING JOINING METHOD

CROSS-REFERENCE TO RELATED APPLICATIONS

This application is filed under 35 U.S.C. § 371 U.S. National Phase of International Application No. PCT/EP2021/054728 filed Feb. 25, 2021 (published as WO2021175702), which claims priority benefit to French Application No. 2002064 filed on Mar. 2, 2020, the disclosures of which are herein incorporated by reference in their entirety.

TECHNICAL FIELD

The present invention lies in the field of wiper actuating linkage systems. The present invention relates in particular to a ball joint housing support for a connecting rod of such a system. The invention also relates to a corresponding connecting rod and to the method of assembling it with such a support.

BACKGROUND OF THE INVENTION

A motor vehicle is conventionally equipped with wipers for wiping and washing the windscreen and avoiding disruption to the driver's view of his surroundings. These wipers generally comprise an actuating arm for actuating a wiper blade, which effects an angular back-and-forth movement. The wiper blades, which are generally elongate, carry blade rubbers made of a resilient material. In operation, these blade rubbers rub against the windscreen and evacuate the water by removing it from the driver's field of view. The actuating arm of each wiper blade is connected, by its opposite end from the blade, to a linkage system in order to be driven in rotation.

BRIEF SUMMARY OF THE INVENTION

The linkage system comprises at least one connecting rod, each longitudinal end of which is articulated to a crank that rotates as one with a drive shaft of a wiper, and more particular the arm thereof.

Each longitudinal end of the connecting rod carries a ball joint housing in which a crank pin is mounted so as to form a connection of the ball joint type. The crank pin itself is secured to one end of a crank, an opposite end of which is secured to a drive shaft of a wiper.

The linkage system may have a simplified configuration, namely may be a tubeless control linkage with a driveshaft that forms the axle of a blade carrier on the driver side and with a rotational-guidance bearing for a driveshaft that forms the axle of a wiper on the passenger side, the connecting rod connecting the two axles. Other configurations are known. For example, there may be a conventional control linkage with a driveshaft controlling two axles for two different connecting rods.

Furthermore, the crank pin can be force-fitted into an internal cavity of the ball-joint housing. It can be held in the cavity by snap-fastening, or using an additional retaining piece.

The ball joint housing may be overmolded onto the connecting rod or may be locked to the connecting rod, for example being locked on by snap-fastening or using an additional device. The assembly of the connecting rod requires several movements and therefore involves multiple applications of assembly forces to secure the crank pin to the ball joint housing and then to lock the assembly to the connecting rod.

According to another known solution, the ball joint housing can be in the form of two half-housings assembled around the crank pin. The ball-joint housing can then be joined to the connecting rod by snap-fastening. The snap-fastening force thus has a dual function of, on the one hand, keeping the connecting rod on the ball joint housing and, on the other hand, keeping the ball-joint housing on the crank pin. However, when the connecting rod is in use, there is a risk of the accidental disassembly of the connecting rod when the forces in the connecting rod are too high.

Moreover, depending on the configuration of the ball joint housing, the assembly of the linkage system on motor vehicle assembly lines may require very specific tooling such as pliers, crimpers for example for crimping the ball joint housing to the crank pin. This additionally requires positioning and also alignment forces for assembling the various parts of the connecting rod of the linkage system. Such an assembly may therefore prove to be complex.

One objective of the invention is to at least partially alleviate these disadvantages of the prior art by proposing a solution that makes it possible to reduce the forces involved in assembling a connecting rod with a ball-joint housing intended to accept a crank pin secured to a crank, while at the same time limiting the risk of accidental disassembly of the connecting rod when in use in a wiper actuating linkage system.

A further objective of the invention is to allow simple assembly of the connecting rod with the ball-joint housing, which can be carried out manually without the aid of specific tools, on motor vehicle assembly lines.

To this end, one subject of the invention is a support for a ball-joint housing for a connecting rod of a wiper actuating linkage system, the support comprising a ball joint housing extending along a longitudinal axis and configured to be received in a complementary orifice on the connecting rod. According to the invention, the support is configured to be assembled by rotation with the connecting rod.

The support advantageously comprises at least one rotational-guidance element guiding the rotation of the connecting rod about the longitudinal axis of the ball joint housing into a final assembly position.

The support advantageously comprises at least one retaining element configured to collaborate with the connecting rod and keep it in the final assembly position in which it is assembled with the support of the ball-joint housing.

The support advantageously comprises at least one rotation-blocking element configured to prevent the connecting rod from rotating out of the final assembly position.

Thus, the support for the ball-joint housing can perform both a function of rotationally guiding the corresponding connecting rod and a function of maintaining the position and of blocking the rotation thereof.

The guidance and/or retention and/or rotation-blocking functions may be performed by the one same element or by a number of distinct elements. The rotation-blocking function may be achieved by snap fastening.

The overmolding of the ball joint housing onto the connecting rod, as is performed in certain solutions of the prior art, can be eliminated. Likewise, there is no longer a need to deliver the connecting rod, the crank pin on the crank and the ball joint housing to the end customer such as a motor manufacturer as three separate parts for them to manually assemble. The solution of the invention allows the delivery, ready for assembly, of, on the one hand, the connecting rod on its own and, on the other hand, the ball-joint housing carried by the support and already assembled onto the crank pin on the crank. The connecting rod can be effortlessly assembled with the ball-joint housing support according to the invention by the end customer.

In addition, delivering the ball joint housing already attached to the crank pin means that this pre-assembly can be delivered ready lubricated and that a ball-joint housing seal can be fitted between the crank and the ball-joint housing, thus improving the sealing of the ball joint housing on the crank pin.

The ball-joint housing support may also have one or more of the following features described below, considered separately or in combination.

The support may be produced in one piece with the ball joint housing.

The support is configured to collaborate with a connecting rod of elongate overall shape.

According to one aspect, the support defines a receptacle configured to at least partially receive the connecting rod in the final assembly position. This receptacle may comprise at least two receptacle parts.

According to one embodiment, the receptacle comprises a first part equipped with the ball joint housing, configured to receive a longitudinal end of the connecting rod exhibiting the orifice complementary to the ball-joint housing.

The housing may comprise a second part extending transversely with respect to the longitudinal axis of the ball joint housing, configured to receive a longitudinal portion of the connecting rod in the axial continuation of the longitudinal end.

The support has for example a contour delimiting the receptacle in the overall shape of a U.

According to another aspect, the support has an elongate overall shape. This elongate shape extends transversely to the longitudinal axis of the ball-joint housing.

The support is for example of oblong overall shape.

The receptacle defined by the support may have an elongate overall shape.

According to one option, the support has an opening on one side of the receptacle, particularly a long side of the elongate shape, so as to allow the connecting rod to be inserted into the receptacle.

The support comprises for example a bottom wall from which the ball-joint housing extends.

The first part of the receptacle may comprise at least one rotational-guidance surface for guiding the longitudinal end of the connecting rod.

According to one embodiment, the rotational-guidance surface has an at least partially circular or cylindrical or spherical shape.

A rotational-guidance surface may be formed by the external cylindrical wall of the ball joint housing.

Another rotational-guidance surface that is at least partially circular may be formed on the bottom wall of the support, distinct from the cylindrical wall of the ball-joint housing.

The rotational-guidance surface or surfaces provided at the first part of the receptacle are advantageously centred on the ball-joint housing.

The first part of the receptacle may have an at least partially spherical overall shape.

The first part of the receptacle defines for example at least a first angular sector configured to be arranged facing the longitudinal end of the connecting rod in a first assembly position.

The first part of the receptacle defines for example at least a second angular sector configured to be arranged facing the longitudinal end of the connecting rod in the final assembly position.

The angular sectors are advantageously configured to allow the connecting rod to rotate by an amplitude of the order of 90° between the first angular sector and the second angular sector.

According to another aspect, the receptacle comprises at least one retaining tab having a bearing surface configured to bear against the connecting rod in the final assembly position.

The first part of the receptacle may comprise at least one retaining tab in the region of the second angular sector and having a bearing surface configured to bear against the longitudinal end of the connecting rod in the final assembly position.

The second part of the receptacle may comprise at least one retaining tab having a bearing surface configured to bear against the longitudinal portion of the connecting rod in the final assembly position.

At least one of the bearing surfaces forms a surface that reacts load along the longitudinal axis of the ball-joint housing.

According to one embodiment, the second part of the receptacle has two opposite sides, one on each side of a bottom wall. The two sides may have different thicknesses along the longitudinal axis of the ball joint housing.

At least one of the tabs is provided on the thickest side of the second part of the receptacle.

According to yet another aspect, the second part of the receptacle has at least two opposite rotation-blocking and retaining surfaces between which the longitudinal portion of the connecting rod is configured to be received in the final assembly position.

The rotation-blocking and retaining surfaces are for example planar or substantially planar.

Advantageously, the support comprises a guide ramp configured to be in contact with the connecting rod during assembly by rotation of the support with the connecting rod. This then ensures linear-to-planar contact between the connecting rod and the ball-joint housing support during rotation.

The guide ramp can be arranged in such a way as to rotationally guide the longitudinal portion of the connecting rod in the axial continuation of the longitudinal end of the connecting rod.

According to another aspect, the support may comprise a leg delimiting one side of the second part of the receptacle and exhibiting the guide ramp. Such a leg may extend, from the first part of the receptacle, transversely with respect to the longitudinal axis of the ball joint housing. This leg offers the support some flexibility along the axis of the ball-joint housing in the event of force applied by the connecting rod during assembly by rotation, particularly against the guide ramp. Thus, the support deforms during the rotational movement until it comes to rest on the other side of the connecting rod to provide snap fastening.

The leg is for example chamfered at its end, thereby defining the guide ramp.

Finally, the ball joint housing has an internal cavity configured to receive a complementary crank pin.

The invention also relates to a connecting rod for a wiper actuating linkage system. The connecting rod has an elongate overall shape and one longitudinal end comprises an orifice configured to receive a complementary ball-joint housing.

The connecting rod may have one or more of the following features described below, considered separately or in combination.

According to one aspect, the connecting rod may in particular be configured to be assembled by rotation with a ball-joint housing advantageously provided on a ball joint housing support as defined hereinabove.

The connecting rod may have at least one contact surface configured to collaborate with a rotational-guidance element on the ball-joint housing, advantageously on the ball joint housing support, during assembly by rotation with the ball-joint housing, advantageously with the ball-joint housing support.

The connecting rod may have at least one contact surface configured to collaborate with the ball-joint housing support, and in particular with a complementary retaining element on the ball joint housing support in a final assembly position.

The connecting rod may comprise a contact surface on a longitudinal end edge of the connecting rod configured to come to bear against a retaining tab in the region of the second angular sector of the receptacle first part of the support.

The connecting rod may comprise a contact surface on a longitudinal end edge of the connecting rod configured to come to bear against a retaining tab in the region of the receptacle second part of the support.

In a variant or in addition, the connecting rod may comprise two lateral contact surfaces of the connecting rod which are configured to come to bear against two opposite rotation-blocking and retaining surfaces of the receptacle second part of the support.

The longitudinal end edge of the connecting rod may be rounded.

According to another aspect, the connecting rod may have a flange ring bordering the orifice. This flange ring is configured to surround the complementary ball joint housing.

The flange ring is created for example by deforming a metal strip for forming the connecting rod, along a surface perpendicular to the surface of the metal strip. Such a flange ring, also known as a flanged edge, ensures that load is reacted in collaboration with the external cylindrical wall of the ball-joint housing.

The invention also relates to a wiper actuating linkage system comprising at least one ball joint housing support as defined hereinabove.

The linkage system comprises at least one connecting rod as defined hereinabove.

The linkage system advantageously comprises complementary rotational-guidance elements carried, on the one hand, by the connecting rod and, on the other hand, by the ball-joint housing support.

The linkage system comprises complementary retaining elements carried, on the one hand, by the connecting rod and, on the other hand, by the ball joint housing support, and configured to keep the connecting rod in a final assembly position in which it is assembled with the ball-joint housing support.

The linkage system comprises complementary rotation-blocking elements carried, on the one hand, by the connecting rod and, on the other hand, by the ball joint housing support, and configured to prevent the connecting rod from rotating out of the final assembly position.

The invention applies to any configuration of the linkage system, for example both to a conventional configuration and to a simplified configuration.

The invention also relates to method for assembling a connecting rod of a linkage system as defined hereinabove with a ball-joint housing support as defined hereinabove.

The method of assembly comprises the following steps:
inserting the ball-joint housing into an orifice at one longitudinal end of the connecting rod using a relative translational movement along the longitudinal axis of the ball joint housing,
effecting a movement of relative rotation between the support for the ball joint housing and the connecting rod as far as a final assembly position in which the connecting rod is held against at least one retaining element on the support and blocked against rotation by at least one rotation-blocking element on the support.

The method may also have one or more of the following features described below, considered separately or in combination.

The ball joint housing may be pre-assembled with the crank pin on the crank.

When the ball-joint housing engages in the orifice in the connecting rod, the longitudinal end of the connecting rod comes to face a first angular sector of a receptacle first part of the support.

The rotational movement may be of an amplitude of the order of 90°.

The rotational movement is for example performed until the longitudinal end comes to face a second angular sector of the receptacle first part of the support and until the longitudinal portion of the connecting rod is received in a receptacle second part of the support.

According to one particular aspect, during the rotational movement, the longitudinal portion of the connecting rod may be guided by at least one guide ramp on a leg defining the receptacle second part. The leg may deform so that it can snap fasten on the other side of the connecting rod.

Such assembly makes it possible to reduce assembly forces. In addition, the reaction of load is optimized notably thanks to the retaining tabs bearing against one or more contact surfaces of the connecting rod, and possibly thanks to a constant barrel around the crank pin mounted in the ball-joint housing and at least partially surrounded by the flange ring of the connecting rod.

BRIEF DESCRIPTION OF THE DRAWINGS

Further advantages and features of the invention will become more clearly apparent from reading the following description, given by way of illustrative and non-limiting example, and the appended drawings, in which:

FIG. 1 is a schematic perspective view of a wiper actuating linkage system of a motor vehicle.

FIG. 2 is a view on a larger scale of a part of the linkage system of FIG. 1 showing one end of the connecting rod assembled with a ball-joint housing support accepting a crank pin on a crank according to a first embodiment.

FIG. 5 is a perspective view of the ball-joint housing support of FIGS. 2 to 4.

FIG. 6 shows the connecting rod and the ball-joint housing support of FIGS. 2 to 4 in a position of engagement of the ball joint housing in an orifice in the connecting rod during the assembly of the connecting rod with the ball joint housing support.

FIG. 14 shows the positioning of the ball-joint housing support according to the first embodiment with respect to the connecting rod, with the ball-joint housing receiving the crank pin on the crank and engaged in the orifice in the connecting rod prior to assembly by rotation of the connecting rod and of the ball-joint housing support.

FIG. 15 shows the ball-joint housing support according to the first embodiment in a first intermediate position with respect to the connecting rod receiving the ball joint housing during rotation.

FIG. 16 shows the ball joint housing support according to the first embodiment in a second intermediate position with respect to the connecting rod receiving the ball-joint housing during rotation.

FIG. 17 shows the positioning of the ball-joint housing support according to the first embodiment, receiving the crank pin on the crank, and of the connecting rod in the final assembly position after rotation.

FIG. 18 schematically depicts a step of engaging the connecting rod around the ball-joint housing receiving the crank pin on the crank and carried by the ball joint housing support according to the second embodiment.

FIG. 19 shows the positioning of the connecting rod receiving the ball-joint housing of FIG. 18 prior to assembly by rotation of the connecting rod and of the ball-joint housing support.

DETAILED DESCRIPTION OF THE INVENTION

Figure 3:
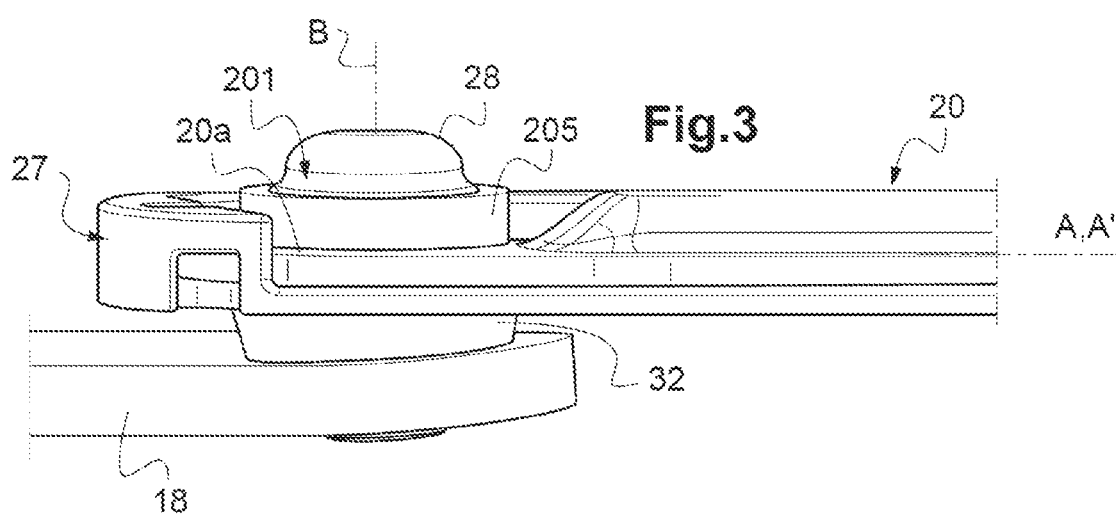
FIG. 3 is a perspective view showing a ball-joint housing seal positioned between the ball joint housing support and the crank of FIG. 2.

In these figures, identical elements bear the same reference numerals.

The following embodiments are examples. Although the description refers to one or more embodiments, this does not necessarily mean that each reference relates to the same embodiment, or that the features apply only to a single embodiment. Individual features of various embodiments may also be combined or interchanged to provide other embodiments.

In the description, certain elements may be indexed, such as first element or second element, for example. In this case, this is merely indexing for differentiating and denoting elements that are similar but not identical. This indexing does not imply that one element takes priority over another and such denominations can easily be interchanged without departing from the scope of the present description. This indexing does not imply an order in time either.

Wiper Actuating Linkage System:

Reference is first of all made to FIG. 1, which shows a wiper actuating linkage system 10 of a motor vehicle, referred to as system 10 below. In the state mounted in a motor vehicle, the system 10 is generally fixed to the body 12 of the vehicle.

The control linkage configuration detailed hereinafter is a non-limiting example of a simplified control linkage. Naturally, the invention also applies to other configurations, notably to a conventional control linkage (not illustrated) with a motor controlling two axles for two different connecting rods.

According to the particular example of FIG. 1, the system 10 comprises a mounting plate 14 for supporting a rotational-guidance bearing for guiding the rotation of a drive shaft 16 of a first wiper (not shown). This first wiper comprises in the conventional way an actuating arm actuating a wiper blade (not shown). One longitudinal end of the actuating arm is secured to the drive shaft 16 and its opposite longitudinal end is connected to the wiper blade. The wiper blade carries a blade rubber intended to wipe the windscreen of the vehicle.

The system 10 also comprises at least one crank 18 and a connecting rod 20.

The connecting rod 20 has a substantially rectilinear elongate overall shape extending along an axis of elongation A between the first longitudinal end 20a and a second longitudinal end 20b. The features of the connecting rod 20 will be specified hereinafter.

One end of the crank 18 rotates as one with the drive shaft 16 of the first wiper. The other end of the crank 18 is articulated to a first end 20a of the connecting rod 20.

The system 10 comprises another mounting plate 22 for supporting an electric geared motor 23, the output shaft 24 of which is intended to drive a second wiper (not shown). This second wiper, which is not shown, is similar to the one described above.

The system 10 has another crank 26, one end of which rotates as one with the output shaft 24. The other end of the crank 26 is articulated to a second longitudinal end 20b of the connecting rod 20.

At least one or each end 20a, 20b of the connecting rod 20 is articulated to a corresponding crank 18, 26. In particular, at least one or each of the ends 20a, 20b of the connecting rod 20 may be articulated via a support 27 comprising a housing known as the ball joint housing 28, better visible in FIG. 2, and via a corresponding crank pin 30, just a portion of which is visible in FIG. 2. The support 27, also known as the ball-joint housing support, will be described in greater detail hereinafter.

In general, the crank pin 30 is designed to be received at least partially in a complementary internal cavity of the ball joint housing 28, so as to form a connection of the ball joint type. The crank pin 30 may, by way of example, have a portion of spherical overall shape intended to be received in the ball-joint housing 28. It may additionally comprise a portion of cylindrical overall shape visible in FIG. 2 allowing connection to the corresponding crank. The crank pin 30 may for example be fixed by crimping to one end of the corresponding crank 18. Thus, the connection between the crank pin 30 and the ball-joint housing 28 ensures the articulation between the connecting rod 20 and the corresponding crank, for example 18.

On assembly, the crank pin 30 may extend in the same axial direction as the driveshaft 16 secured to the opposite end of the crank 18 (FIG. 1), in the same sense of the direction or alternatively in the opposite sense of the direction, in other words upwards or downwards relative to the crank 18, with reference to the orientation of FIG. 2.

A ball-joint housing seal 32 may be positioned around the, for example cylindrical, portion of the crank pin between the crank 18 for example and the ball joint housing 28, as depicted in FIG. 3. That improves the sealing of the ball-joint housing 28 on the crank pin (which is no longer visible in FIG. 3 because of the ball joint housing seal).

Moreover, two supports 27 for ball-joint housings 28 may be arranged identically on the two (driver and passenger) sides. Alternatively, the supports 27 for ball-joint housings 28 may be arranged symmetrically on the two sides.

Ball-Joint Housing Support:

As regards the ball joint housing support 27, as already stated, it comprises the ball-joint housing 28 intended to receive the crank pin. Advantageously, the support 27 and the ball-joint housing 28 are produced in one piece. The support 27 for the ball-joint housing 28 forms a one-piece component.

The support 27, and particularly the ball-joint housing 28, may be made of plastic.

The support 27 of the ball-joint housing 28 may also be produced in several parts, for example in several different plastics materials, notably by co-molding, or may even incorporate at least a part that is non-plastic and for example made of metal.

The ball-joint housing 28 is intended to be mounted in an orifice 201 at one longitudinal end, for example 20a, of the connecting rod 20.

In general, the ball joint housing 28 has an elongate shape extending along a longitudinal axis B. This longitudinal axis B is coincident with the longitudinal axis of the crank pin when it is received in the ball-joint housing 28.

Figure 4:
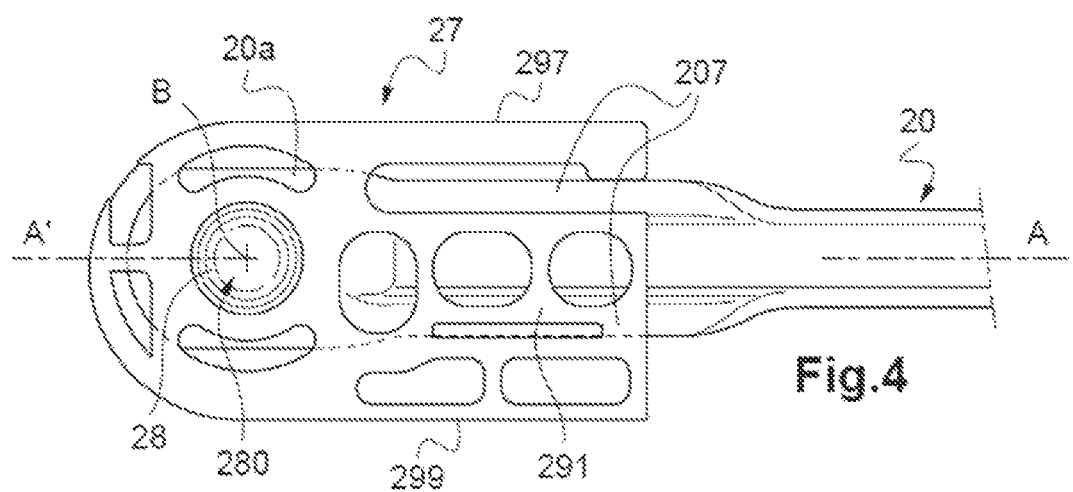
FIG. 4 is a view from beneath of the longitudinal end of the connecting rod assembled with the ball-joint housing support.

The ball joint housing 28 defines an internal cavity 280, visible in FIG. 4, intended to at least partially receive the complementary crank pin. It has an overall shape that complements that of the crank pin that it is intended to receive. By way of example, the internal cavity 280 may have a spherical overall shape. The axis of revolution of the internal cavity 280 corresponds to the longitudinal axis B of the ball joint housing 28. The ball-joint housing 28 may have an external shape (as opposed to the internal cavity 280) of a hat or of a bell. Any other shape may be envisioned. The ball joint housing 28 may thus for example be of conical shape.

The internal cavity 280 is dimensioned in such a way as to allow the insertion of the complementary crank pin into the internal cavity 280. It is also advantageously dimensioned in such a way as to allow the crank pin to be retained in the ball-joint housing 28 when the linkage system is in the assembled state.

The internal cavity 280 is open at least at one axial end of the ball joint housing 28. This provides access for inserting the crank pin into the ball-joint housing 28.

The ball-joint housing 28 may or may not comprise a wall forming a cavity bottom wall, at the opposite axial end to the opening for the insertion of the crank pin.

Moreover, the support 27 generally exhibits a shape that complements the shape of the longitudinal end 20a of the connecting rod 20 with which it is intended to collaborate.

For example, the support 27 has an overall shape that is elongate along an axis of elongation A'. This elongate shape complements the shape of the longitudinal end 20a of the connecting rod 20, which is for example of elongate shape. The support 27 is for example of oblong overall shape.

The axis of elongation A' of the support 27 is transverse to the longitudinal axis B of the ball-joint housing 28.

The support 27 is configured to be assembled by rotation with the connecting rod 20. In particular, the support 27 and the connecting rod 20 may be intended to be assembled by a relative rotational movement through the order of 90°, or a quarter of a turn.

The assembly movement is intended to be performed from a first assembly position, in which the ball joint housing engages in the orifice 201 of the connecting rod 20, as far as a final assembly position. In the final assembly position, as depicted in FIGS. 2 to 4, the axis of elongation A' of the support 27 is coincident with the axis of elongation A of the connecting rod 20. The assembly method will be described in greater detail hereinafter.

In order to allow assembly by rotation, the support 27, better visible in FIG. 5, advantageously comprises at least one rotational-guidance element guiding the rotation of the connecting rod about an axis of rotation as far as a final assembly position. The axis of rotation is coincident with the longitudinal axis B of the ball-joint housing 28.

Such a rotational-guidance element is configured to collaborate with a complementary guidance element provided on the connecting rod (not depicted in FIG. 5), as specified hereinafter. Such a rotational-guidance element on the support 27 may, non-exhaustively, be a guidance surface 271, 273, which is for example at least partially circular, cylindrical or even spherical, or a guide ramp 275. Particular examples are described hereinafter.

The support 27 also advantageously comprises at least one retaining element configured to collaborate with the connecting rod (not depicted in this FIG. 5) and keep it in the final assembly position in which it is assembled with the support 27 of the ball joint housing. Such a retaining element is configured to collaborate with a complementary element on the connecting rod, as specified hereinafter. Such a retaining element on the support 27 may for example be a retaining tab 277. Particular examples are described hereinafter.

The support 27 also advantageously comprises at least one rotation-blocking element configured to prevent the connecting rod from rotating out of the final assembly position. Such a blocking element is configured to collaborate with a complementary element on the connecting rod 20, as specified hereinafter. The rotation blocking may for example be performed by one or more blocking and retaining surfaces 279 between which the connecting rod is intended to become wedged. One embodiment is described hereinafter.

The guidance, retention and rotation-blocking functions may be performed by the one same element or by a number of distinct elements.

In addition, the support 27 defines a receptacle 29 configured to at least partially receive the connecting rod 20 in the final assembly position.

The support 27 comprises for example a wall 291 forming a bottom wall of the receptacle 29. The bottom wall 291 may or may not be perforated.

The receptacle 29 defined by the support 27 may define an overall shape that is elongate along the axis of elongation A'.

According to one option, the support 27 has an opening on one side of the receptacle 29, particularly a long side of the elongate shape, so as to allow the connecting rod to be inserted into the receptacle 29.

In addition, this receptacle 29 comprises for example a first part 29a and a second part 29b. The bottom wall 291 is, in this example, common to both of the two receptacle parts 29a, 29b.

The first part 29a is equipped with the ball joint housing 28. The latter extends from the bottom wall 291, perpendicular to the overall plane defined by the bottom wall 291, along the longitudinal axis B.

Figure 7:
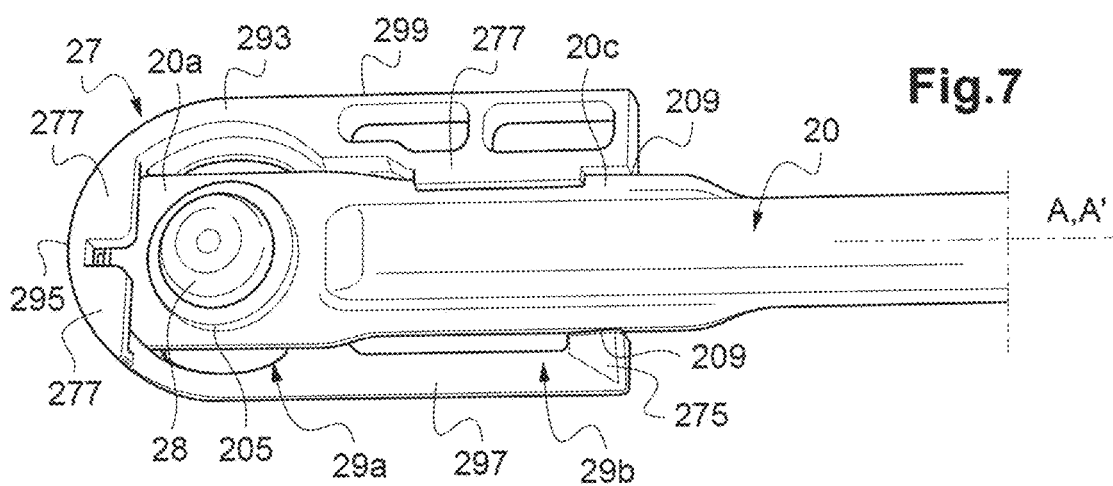
FIG. 7 shows the connecting rod and the ball joint housing support of FIG. 6 in a final assembly position after rotation.

With reference to FIGS. 5 to 7, the first part 29a of the receptacle 29 is configured to receive the longitudinal end 20a of the connecting rod 20. This first part 29a therefore has a shape that complements the shape of the longitudinal end 20a. Further, the first part 29a is configured in such a way as to allow this longitudinal end 20a to rotate about the ball joint housing 28. It defines for example at least two locations between which the longitudinal end 20a of the connecting rod 20 can rotate.

By way of example, the first part 29a of the receptacle 29 has an at least partially spherical shape.

Furthermore, it defines for example at least two sectors facing which the longitudinal end 20a of the connecting rod 20 is intended to be positioned between two extreme assembly positions (which are depicted in FIGS. 6 and 7). The sectors are of a shape that complements the shape of the end 20a of the connecting rod 20. In this example with a spherical receptacle first part 29a, these are angular sectors 293, 295.

A first angular sector 293 is configured to be positioned facing the longitudinal end 20a of the connecting rod 20 in a first assembly position, as depicted in FIG. 6.

A second angular sector 295 is configured to be positioned facing the longitudinal end 20a of the connecting rod 20 in the final assembly position, as depicted in FIG. 7.

The angular sectors are, for example, configured to allow the connecting rod 20 to rotate by an amplitude of the order of 90° between the first angular sector 293 and the second angular sector 295.

Referring once again to FIG. 5, the second part 29b of the receptacle 29 extends longitudinally along the axis of elongation A'. This second part 29b is configured to receive, in the final assembly position, a longitudinal portion 20c of the connecting rod 20 extending in the axial continuation of the longitudinal end 20a thereof, as depicted in FIG. 7.

Figure 8:
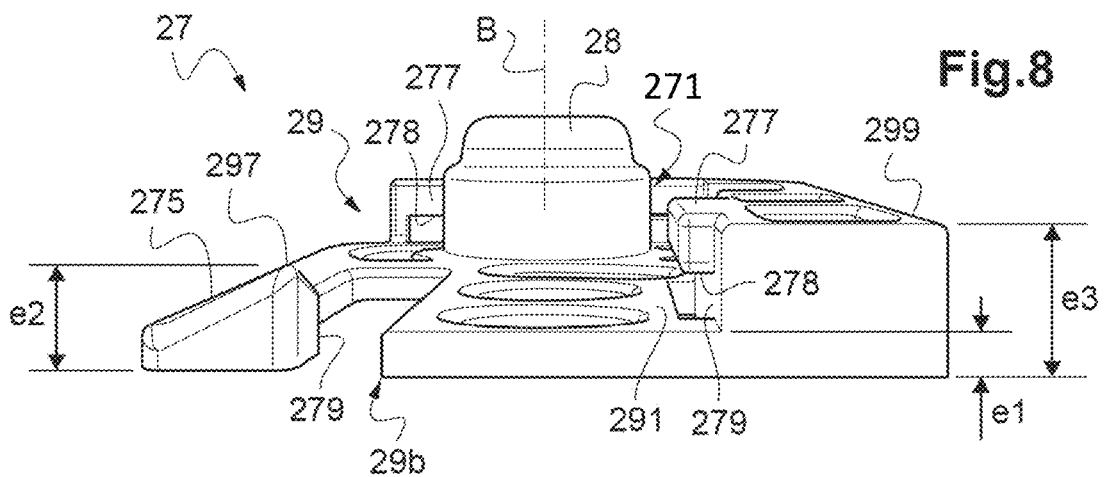
FIG. 8 is a side view of the ball-joint housing support of FIGS. 2 to 7.

With reference to FIG. 8, the second part 29b of the receptacle 29 may comprise two opposite sides 297, 299 one on each side of the bottom wall 291. These two sides 297, 299 have, for example, different thicknesses along the longitudinal axis B of the ball-joint housing 28.

A first side 297 may have for example mainly the same thickness e1 as the bottom wall 291. A longitudinal end edge of this first side 297 may have a progressive thickness evolving from the first thickness e1 to a second thickness e2 that is greater than the thickness e1 of the bottom wall 291. This progressive thickness may be achieved using a chamfer. The inclination may be of the order of 20° to 70°, for example preferably around 60°, with respect to the overall plane defined by the bottom wall 291.

The first side 297 may be separated from the bottom wall 291 by a slot, thus forming a leg giving the support 27 flexibility. This leg extends from the first part 29a of the receptacle 29 transversely with respect to the longitudinal axis B of the ball-joint housing 28.

A second side 299 may have for example a thickness e3 that is greater than the thicknesses e1, e2 of the bottom wall 291 and of the first side 297.

Moreover, the receptacle 29 may be configured to provide rotational guidance of the connecting rod.

To this end, the receptacle 29, and particularly the second part 29b of the receptacle 29, may comprise at least one rotational-guidance element such as the guide ramp 275. This guide ramp 275 is defined for example by the progressive thickness. The guide ramp 275 may be provided on the smallest-thickness side 297 of the second part 29b of the receptacle 29.

According to the particular example described hereinabove, the leg provided on the first side 297 exhibits such a guide ramp 275 at its free end, which is to say at the opposite end to the receptacle first part 29a. The guide ramp 275 is defined by the chamfer.

The guide ramp 275 is configured in such a way as to be in contact with the connecting rod, particularly a longitudinal portion in the continuation of the longitudinal end of the connecting rod, during the rotational movement for assembling the connecting rod with the ball-joint housing support 27, thus ensuring linear-to-planar contact between the connecting rod and the ball-joint housing support 27.

Figure 9:
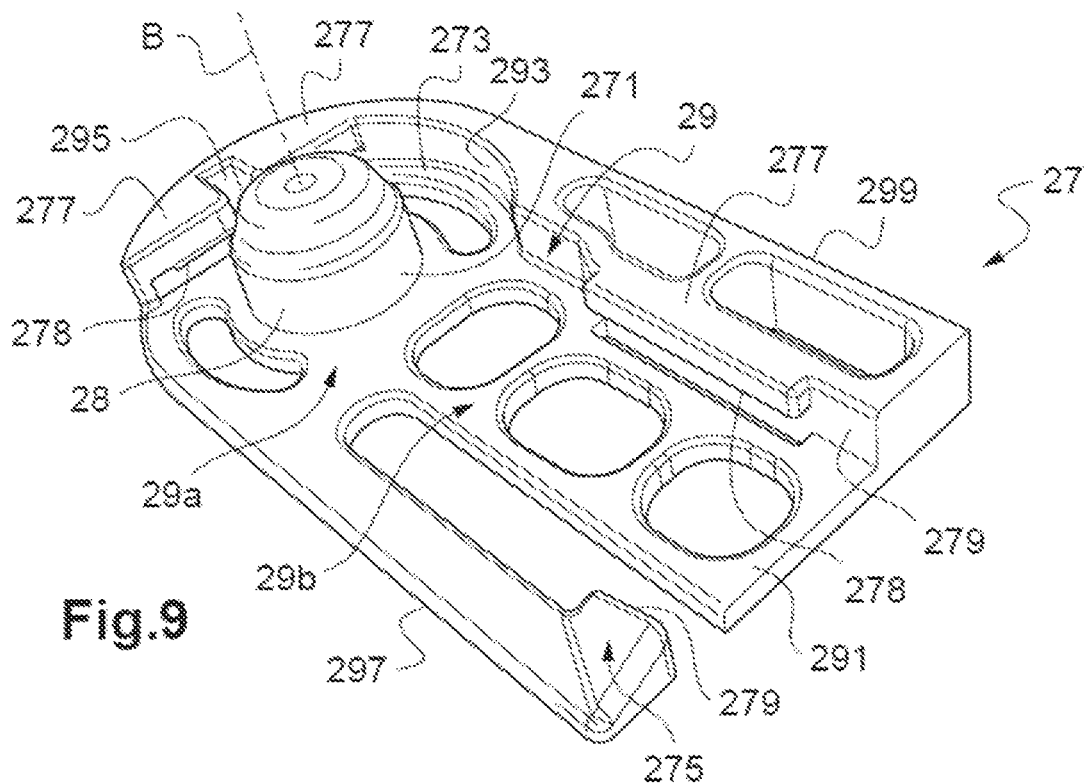
FIG. 9 is a perspective view of the ball-joint housing support of FIGS. 2 to 8.

In addition, with reference to FIG. 9, the receptacle 29, and particularly the first part 29a of the receptacle 29, may comprise at least one rotational-guidance element such as the rotational-guidance surface or surfaces 271, 273 of the longitudinal end of the connecting rod (which is not depicted in this figure). The rotational-guidance surface or surfaces 271, 273 provided at the first part 29a of the receptacle 29 are advantageously centred on the ball joint housing 28.

A rotational-guidance surface 271 may be formed by the external cylindrical wall of the ball joint housing 28. This cylindrical rotational-guidance surface 271 is intended to collaborate with a complementary surface, for example a cylindrical surface around an orifice at the longitudinal end of the connecting rod, in which orifice the ball-joint housing 28 is intended to be engaged, as described hereinafter.

As an alternative or in addition, at least one rotational-guidance surface 273 may be formed on the bottom wall 291 of the support 27. This is for example the surface of the bottom wall 291 in line with at least one angular sector 293, 295. Such a guidance surface 273 may or may not be at least partially circular.

Moreover, the receptacle 29 may be configured to allow the connecting rod 20 to be retained in the final assembly position (FIG. 7).

To this end, with reference to FIGS. 7 to 9, the receptacle 29 may comprise at least one retaining element such as a retaining tab 277, having a bearing surface 278 against which the connecting rod 20 is configured to come to bear in the final assembly position. In particular, the connecting rod 20 is intended to be held against the bottom wall 291 and the bearing surface 278 of one or more retaining tabs 277.

Such a retaining tab 277 may be provided at the first part 29a of the receptacle 29. As an alternative or in addition, such a retaining tab 277 may be provided at the second part 29b of the receptacle 29.

For example, the first part 29a of the receptacle 29 comprises at least one retaining tab 277, for example two retaining tabs 277, at the second angular sector 295. These retaining tabs 277 may extend along a main axis of extension perpendicular to the axis of elongation N of the support 27 and to the longitudinal axis B of the ball joint housing 28.

In that case, the bearing surface 278 of at least one or each retaining tab 277 is intended to bear against the longitudinal end 20a of the connecting rod 20 in the final assembly position.

In this example, this bearing surface 278 is a lower surface of the retaining tab 277, along the longitudinal axis B of the ball joint housing, according to the orientation of the elements in FIG. 8. It forms a surface that reacts load along the longitudinal axis B of the ball joint housing 28.

Likewise, with reference to FIGS. 7 to 9, the second part 29b of the receptacle 29 may comprise at least one retaining tab 277 having a bearing surface 278 against which the longitudinal portion 20c of the connecting rod 20 bears in the final assembly position.

Such a tab 277 is, for example, provided on the side 299 of greatest-thickness e3 of the second part 29b of the receptacle 29. As previously, the bearing surface 278 is a lower surface of the retaining tab 277, along the longitudinal axis B of the ball joint housing, according to the orientation of the elements in FIG. 8. It forms a surface that reacts load along the longitudinal axis B of the ball-joint housing 28.

Furthermore, the receptacle 29 may be configured to perform a function of preventing rotation of the connecting rod 20 once the ball joint housing support 27 and the connecting rod 20 are in the final assembly position (FIG. 7). By way of example, the receptacle 29 may be configured to allow the connecting rod 20 to be snap-fastened into the receptacle 29 in the final assembly position.

According to one embodiment, the second part 29b of the receptacle 29 may have at least two opposite rotation-blocking and retaining surfaces 279 between which the longitudinal portion 20c of the connecting rod 20 is intended to be received in the final assembly position. These are, for example, planar surfaces 279.

According to the particular embodiment described with a leg on the side 297 offering the support flexibility, this leg exhibits, for example, one of the opposite retaining surfaces at its free end.

Thus, during assembly by rotation, the longitudinal portion 20c of the connecting rod 20 is intended to slide against the guide ramp 275. The leg on the side 297 of the second part 29b of the receptacle 29 deforms, because of the force applied by the connecting rod 20, and snap fastens onto the other side of the connecting rod 20.

FIGS. 2 to 9 show a first embodiment of the support 27 for the ball-joint housing 28. This first embodiment is particularly suitable for an assembly with a corresponding crank pin on a crank, which crank pin is oriented upwards (with reference to the orientation in FIG. 2), which is to say is intended to extend in the same sense of direction as the driveshaft secured to the other end of the crank.

Figure 10:
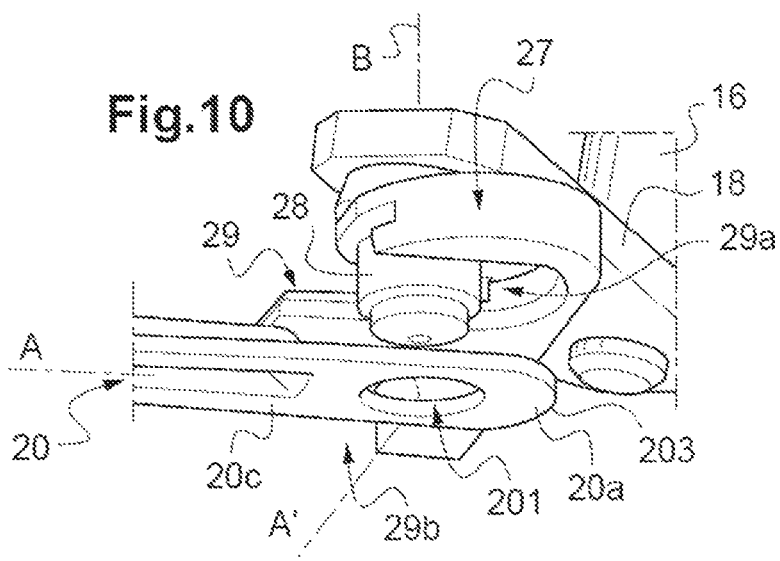
FIG. 10 is an exploded view of one end of a connecting rod and of a ball joint housing support accepting a crank pin on a crank according to a second embodiment, prior to assembly.
Figure 11:
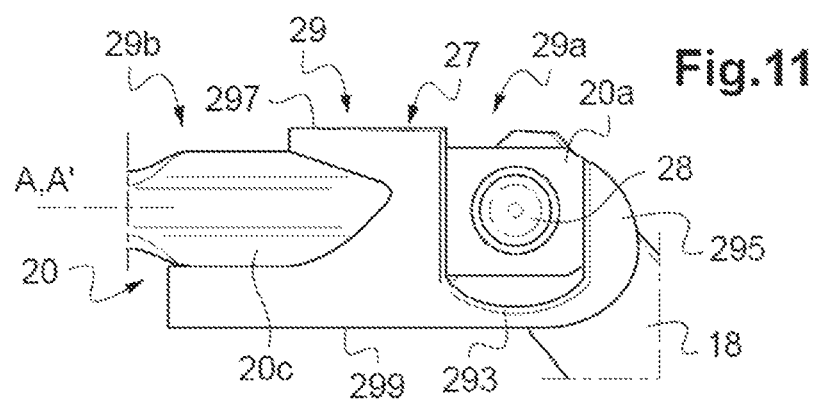
FIG. 11 is a view of the longitudinal end of the connecting rod assembled with the ball-joint housing support accepting a crank pin on a crank according to the second embodiment, after rotation.

A second embodiment of the support 27 for the ball-joint housing 28 is depicted in FIGS. 10 and 11, in a configuration already assembled with a crank pin on a corresponding crank 18. This second embodiment differs from the first embodiment described previously in that the support 27 is particularly suited to being assembled with a crank pin oriented downwards according to the orientation of the elements in FIG. 10, which is to say intended to extend in the opposite sense of direction to the driveshaft secured to the other end of the crank 18 when the linkage system is in the assembled state.

Those features of the support 27 that were described previously with reference to FIGS. 2 to 9 also apply to the support 27 according to the second embodiment of FIGS. 10 and 11, and are not described again.

Connecting Rod:

As regards the connecting rod 20, as previously described, it is intended to collaborate with a support 27 for a ball-joint housing 28 according to one or the other of the alternative forms described hereinabove.

The connecting rod 20 is for example produced by pressing a metal sheet.

This connecting rod 20 has an overall shape that is elongate along the axis of elongation A. At one longitudinal end 20a it comprises an orifice 201 configured to receive the complementary ball joint housing 28.

This longitudinal end 20a has a rounded or substantially rounded end border 203.

In the example of FIG. 10, the longitudinal end 20a of the connecting rod 20 is planar around the orifice 201.

Figure 12:
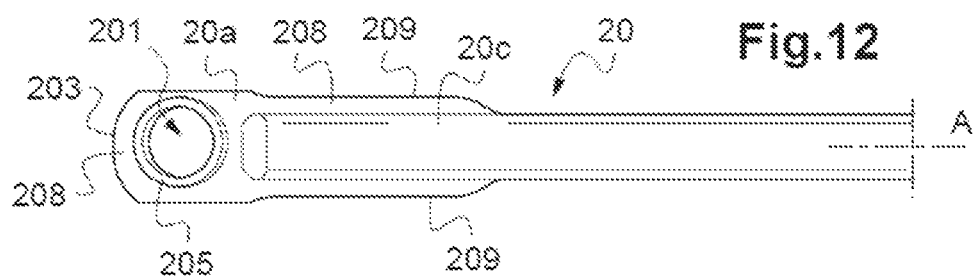
FIG. 12 is a partial view of connecting rod of the linkage system of FIG. 1 according to one embodiment.
Figure 13:
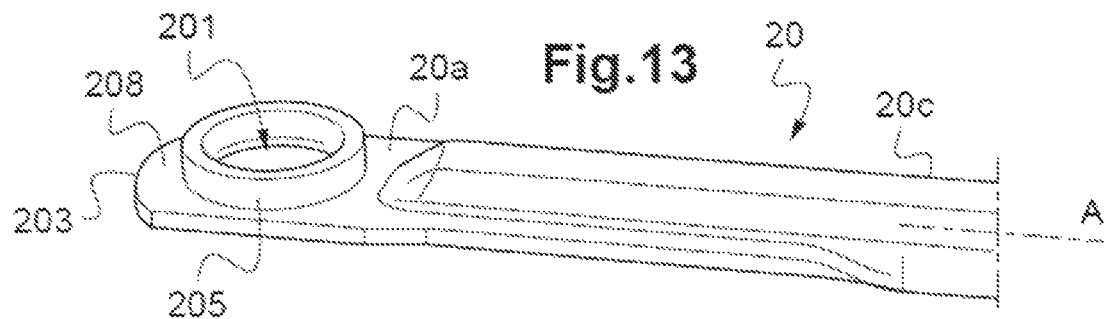
FIG. 13 is a partial perspective view of the connecting rod of FIG. 12.

According to one particular embodiment depicted in FIGS. 12 and 13, the connecting rod 20 at its longitudinal end 20a may comprise a flange ring 205 bordering the orifice 201.

This flange ring 205 is configured to at least partially surround the complementary ball-joint housing upon assembly of the connecting rod 20 with the ball-joint housing support. It has a shape that complements the shape of the external surface of the ball-joint housing. The flange ring 205 defines for example a cylindrical overall shape. Any other shape may be envisioned. According to an embodiment variant, the flange ring 205 could be conical in shape for example.

The flange ring 205 is created for example by deforming a metal strip for forming the connecting rod, along a surface perpendicular to the overall plane defined by the longitudinal end 20a of the connecting rod 20. This flange ring 205 is also known as a flanged edge.

Such a flange ring 205 ensures that load is reacted in collaboration with the external cylindrical wall of the ball-joint housing, when the linkage system is in the assembled state.

According to one or the other of the alternatives of FIGS. 10 to 13, the body of the connecting rod 20, with the exception of the longitudinal end 20a that has the orifice 201, may have a U-shaped cross section.

Furthermore, the longitudinal end 20a and the longitudinal portion 20c in the continuation thereof may be widened relative to the rest of the body of the connecting rod 20.

Such a connecting rod 20 is advantageously configured to be assembled by rotation with a ball joint housing support as described previously.

For this purpose, the longitudinal end 20a is configured in such a way as to collaborate in particular with the first part 29a of the receptacle 29 defined by the support 27 for the ball joint housing 28 (see FIGS. 6 and 7). The rounded or substantially rounded end edge of the connecting rod 20 is for example intended to come to face one of the angular sectors 293, 295 in the two extreme assembly positions.

Complementing that of the support, the connecting rod 20 may comprise at least one rotational-guidance element. This may for example be the flange ring 205, where provided, which is intended to collaborate with the cylindrical external surface of the ball-joint housing 28, as depicted in FIGS. 3 and 7.

In addition, the connecting rod 20 has, at the longitudinal portion 20c, a contact surface 207 (see FIG. 4) that is intended to face or more or less face the bottom wall 291 of the support 27 in the assembled state, which is intended to be in contact with the guide ramp 275 (FIG. 5) provided on the support 27. Such contact surfaces 207 may be formed by longitudinal edges of the connecting rod 20 in the longitudinal portion 20c.

Complementing that of the support, the connecting rod 20 may comprise at least one retaining element. For that purpose, the connecting rod 20 may have at least one contact surface configured to collaborate with the ball joint housing support, and in particular with a complementary retaining element on the ball-joint housing support in the final assembly position.

By way of example, the connecting rod 20 may at its longitudinal end have a contact surface 208 (FIG. 12) configured to come to bear against a retaining tab 277 at the second angular sector 295 of the receptacle first part 29a of the support 27 (as indicated schematically in FIG. 7).

As an alternative or in addition, the connecting rod 20 may exhibit a contact surface 208 (FIG. 12) on a longitudinal edge of the connecting rod 20 configured to come to bear against a retaining tab 277 in the region of the receptacle second part 29b of the support 27 (as indicated schematically in FIG. 7).

As an alternative or in addition, the connecting rod 20 may comprise two lateral contact surfaces 209 (FIG. 12) which are configured to come to bear against the two opposite rotation-blocking and retaining surfaces 279 of the receptacle second part 29b of the support 27 (see FIGS. 5 and 7).

Assembly Method:

FIGS. 14 to 17 depict steps in the assembling of a connecting rod 20 as depicted in FIGS. 12 and 13 with a ball-joint housing support 27 according to the first embodiment of FIGS. 2 to 9. Similarly, FIGS. 18 and 19 depict steps in the assembling of a connecting rod 20 with a ball-joint housing support 27 according to the second embodiment of FIGS. 10 and 11.

The assembly method described hereinafter can be applied to either one or the other of the embodiments.

A preliminary step of fixing the crank pin to the crank 18, for example by screw-fastening, crimping or some other method, may be provided. The crank pin may be fixed by a portion, for example cylindrical portion, that is not intended to be surrounded by the ball-joint housing 28 on assembly.

Likewise, the ball-joint housing 28 may be pre-assembled with the crank pin on the crank 18.

With reference to FIG. 14 in the case of the first embodiment and to FIG. 18 in the case of the second embodiment, the method may comprise a step for inserting the ball joint housing 28, carried by the support 27, into the complementary orifice 201 at the longitudinal end 20a of the connecting rod 20. This insertion may be performed through a movement of relative translation along an axis coinciding with the longitudinal axis of the ball joint housing 28. The direction of insertion is indicated by the arrow F in FIG. 18 regarding the second embodiment. The translational movement may, of course, take place in the other sense of direction.

The support 27 and the connecting rod 20 are then assembled in a first position depicted in FIG. 14 in the case of the first embodiment and in FIG. 19 in the case of the second embodiment.

In this first position, the longitudinal end 20a of the connecting rod 20 is arranged facing the first angular sector 293 of the first part 29a of the receptacle 29 defined by the support 27.

Thereafter, a movement of relative rotation between the connecting rod 20 and the support 27 for the ball-joint housing 28 is performed as indicated schematically by the arrow R1 in FIG. 14 or R2 in FIG. 19. This is, in particular, a quarter turn rotation. The arrows R1, R2 are indicated schematically by way of illustration. The rotation may be performed in the other sense of direction.

During the rotational movement, the longitudinal end 20a of the connecting rod 20 may be guided by the collaboration of the surface bordering the orifice 201, such as the flange ring 205, where present, with the, for example cylindrical, external surface of the ball joint housing 28.

As an alternative or in addition, the longitudinal portion 20c of the connecting rod 20 may be guided by the guide ramp 275 (see FIG. 15). The longitudinal portion 20c continues the rotational movement (see FIG. 16) and the leg on the side 297 of the receptacle second part 29b may for example deform to snap-fasten onto the other side of the longitudinal portion 20c of the connecting rod 20, as depicted in FIG. 17 in the case of the first embodiment or FIG. 11 in the case of the second embodiment.

The support 27 and the connecting rod 20 are in a final assembly position in which the longitudinal end 20a of the connecting rod 20 is arranged facing the second angular sector 295 of the first part 29a of the receptacle 29 defined by the support 27. In addition, in this position, the longitudinal portion 20c of the connecting rod 20 is received in the second part 29b of the receptacle. The connecting rod 20 is held by at least one retaining element, such as the retaining tabs 277 on the supports 27 and is blocked against rotation between the two opposite surfaces 279 of the support 27. This makes it possible to obtain effective blocking against rotation in the final assembly position, limiting the risk of the connecting rod 20 being released by rotating relative to the support 27 for the ball joint housing 28.

Thus, it is possible to have easy assembly of the connecting rod 20 with the support 27 for the ball-joint housing 28, with no specific tool being required. The assembly by translational movement followed by rotation into the final assembly position is carried out with minimum forces on account of the guidance of the rotation between the connecting rod 20 and the support 27 for the ball joint housing 28. This assembly can be carried out by an operator on a motor vehicle manufacturer assembly line, for example when they receive a linkage system made up of separate component parts.

In the final assembly position, the collaboration between the retaining tabs 277 and the contact surfaces of the connecting rod 20 ensures that load is reacted along the longitudinal axis B of the ball joint housing. The collaboration between the external surface of the ball-joint housing 28 and the flange ring 205 for example on the connecting rod 20, ensures that load is reacted along the other axes.

What is claimed is:

1. A support for a ball-joint housing for a connecting rod of a wiper actuating linkage system, the support comprising:
   a ball-joint housing extending along a longitudinal axis (B) and configured to be received in a complementary orifice on the connecting rod;
   the support is configured to be assembled by rotation with the connecting rod, including:
   at least one rotational-guidance element guiding the rotation of the connecting rod about the longitudinal axis (B) of the ball-joint housing into a final assembly position,
   at least one retaining element configured to collaborate with the connecting rod and keep the connecting rod in the final assembly position in assembly with the support of the ball-joint housing;
   a receptacle having a first side and a second side opposing one another along a bottom wall, wherein the first side is separated from the bottom wall and forms a slot, where a free end forms into a leg that exhibits a guide ramp, where the leg is configured to provide flexibility of the support, the leg delimiting the first side of the receptacle away from a part of the receptacle, in a transverse direction relative to the longitudinal axis (B) of the ball-joint housing; and at least one rotation-blocking element with the guide ramp formed on the free end of a leg portion of the support that is configured to prevent the connecting rod from rotating out of the final assembly position.

2. The support according to claim 1, defining the receptacle configured to at least partially receive the connecting rod having an elongate overall shape, in the final assembly position, the receptacle including:
   a first part equipped with the ball-joint housing, configured to receive a longitudinal end of the connecting rod exhibiting the orifice complementary to the ball-joint housing, and
   a second part extending transversely with respect to the longitudinal axis (B) of the ball-joint housing, configured to receive a longitudinal portion of the connecting rod in the axial continuation of the longitudinal end.

3. The support according to claim 2, wherein the first part of the receptacle comprises at least one rotational-guidance surface for guiding the longitudinal end of the connecting rod.

4. The support according to claim 2, wherein the first part of the receptacle has an at least partially spherical overall shape and defines at least:
   a first angular sector configured to be positioned facing the longitudinal end of the connecting rod in a first assembly position, and
   a second angular sector configured to be positioned facing the longitudinal end of the connecting rod in the final assembly position.

5. The support according to claim 2, wherein the receptacle comprises at least one retaining tab having a bearing surface configured to bear against the connecting rod in the final assembly position.

6. The support according to claim 2, wherein the second part of the receptacle has at least two opposite rotation-blocking and retaining surfaces between which the longitudinal portion of the connecting rod is configured to be received in the final assembly position.

7. The support according to claim 2, comprising the guide ramp configured to be in contact with the connecting rod during assembly by rotation of the support with the connecting rod.

8. The support according to claim 1, where the guide ramp is defined by a progressive thickness at the free end.

9. A connecting rod for a wiper actuating linkage system, the connecting rod having an elongate overall shape and including at one longitudinal end an orifice configured to receive a complementary ball-joint housing; the connecting rod configured to be assembled by rotation with a support of a ball-joint housing according to claim 1, and in that it exhibits:
   at least one contact surface configured to collaborate with a rotational-guidance element of the support during assembly by rotation, and
   at least one contact surface configured to collaborate with a complementary rotation-blocking element and/or retaining element on the support in a final assembly position.

10. A method for assembling a connecting rod of a wiper actuating linkage system with a support for a ball-joint housing according to claim 1,
   the connecting rod having an elongate overall shape and comprising at one longitudinal end an orifice configured to receive said ball-joint housing, said connecting rod further comprising:
   at least one contact surface configured to collaborate with a rotational-guidance element of the support during assembly by rotation, and
   at least one contact surface configured to collaborate with a complementary rotation-blocking element and/or retaining element on the support in a final assembly position;
   wherein the method comprises the following steps:
   inserting the ball-joint housing into an orifice at one longitudinal end of the connecting rod using a relative translational movement along the longitudinal axis (B) of the ball-joint housing,
   effecting a movement of relative rotation between the support for the ball-joint housing and the connecting rod as far as a final assembly position in which the connecting rod is held against at least one retaining element on the support and blocked against rotation by at least one rotation-blocking element on the support.

* * * * *